Nov. 28, 1950    G. A. SWEETMAN    2,531,995
FISHHOOK
Filed July 9, 1948
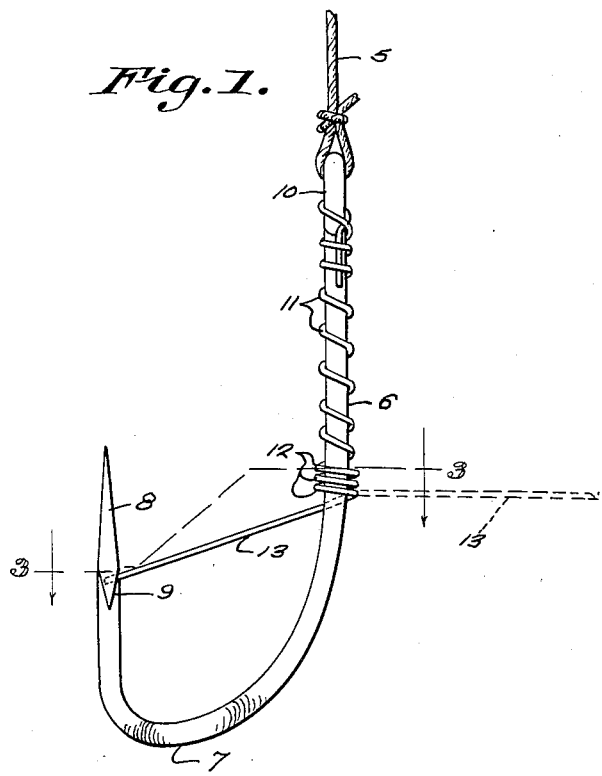
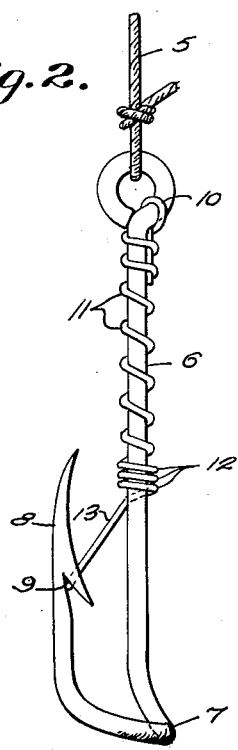
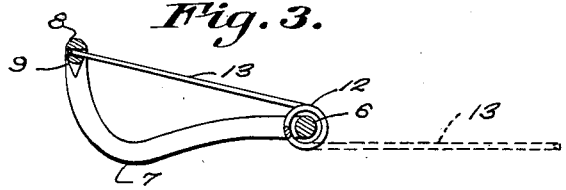
G. A. Sweetman
INVENTOR
BY Knowles
ATTORNEYS.

Patented Nov. 28, 1950

2,531,995

UNITED STATES PATENT OFFICE 2,531,995

FISHHOOK

George A. Sweetman, Trinidad, Colo.

Application July 9, 1948, Serial No. 37,877

1 Claim. (Cl. 43—44.8)

This invention relates to fish hook construction, and more particularly, has reference to a combination fish hook and bait holder.

It is well known in the art that where live bait is used, the impaling of the bait upon the conventional fish hook quite frequently causes the bait to live only a short time, by reason of the thickness of the hook and also by reason of the fact that the barb of the hook must be passed through the bait.

Accordingly, it is one of the main purposes of the present invention to provide a combined hook and bait holder, wherein the bait rather than being impaled upon the hook proper, is held, rather, by a small spring tongue not equipped with a barb, which tongue is additionally so small in diameter as not to injure the live bait except perhaps to a very small extent.

Another important object of the invention is to provide an arrangement as described wherein the barb of the hook serves as a catch for the spring tongue, preventing the bait from slipping off the tongue.

Another important object is to provide a construction wherein, when the bait is taken, the spring tongue automatically will swing to the far side of the hook, so as to be completely clear of the barb portion thereof, thus preventing interference between the bait holder and hook when the line is pulled to hook the fish.

Another important object is to provide a construction as described in which the spring tongue will, when the bait is taken, become a fulcrum on which the hook swings around, within the mouth of the fish, so as to hook the fish with certainty.

Another important object is to provide a construction as described above which will be inexpensive, readily applied to a hook, and capable of use with speed and ease.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings:

Figure 1 is an elevational view of a hook and bait holder formed in accordance with the invention, the bait holder being shown in full line engaged by the barb, and in dotted line in its release position.

Figure 2 is an elevational view taken from the left of Figure 1.

Figure 3 is a section on line 3—3 of Fig. 1.

Referring to the drawings in detail, at 5 I have designated a conventional fishing line, that is secured to the shank 6 of the hook. At its lower end, shank 6 merges into a laterally off-set hook portion 7, which in turn is extended upwardly and to one side of the shank (Fig. 2) merging into the barb 8. At the intersection of the barb 8 and hook portion 7, there is defined the usual crotch 9. Crotch 9 in my hook, however, is not disposed radially of the axis of the shank 6, as in conventional hooks, but rather, is turned sideways, so that the crotch comprises a catch for the free end of the spring tongue, to be described.

Referring to said spring tongue, at its upper end the spring tongue, which is formed from a thin length of spring wire material, is looped through the eye of the hook as at 10. The medial portion of the spring tongue or bait holder is then extended downwardly along the shank, being wound spirally thereon as at 11. The spirally wound portion merges into spring coils 12, from which extend the free end 13 of the holder, said end comprising the bait holding tongue of the device. Tongue 13 is projected laterally away from the shank 6, so that it is engageable in the crotch 9.

It may now be observed that to apply live bait to the hook, the tongue 13 is extended through and transversely of the body of the live bait, in the regular manner. When the live bait is so impaled, it will not be affected adversely to any extent, since the tongue 13 has no barb, and is very thin. Then, the tongue is engaged in the crotch or catch 9, and the hook is ready for use.

When a fish takes the bait, as the fish's mouth closes, it will press downwardly upon the tongue 13, releasing it from its catch. As a result, the tongue and the barb 8 of the hook spring apart laterally within the fish's mouth, with the barb, in effect, moving immediately to the right and the tongue to the left in Fig. 2 while within the mouth of the fish, so that the barb swings against and hooks in one side of the fish's mouth. This action, of course, occurs substantially simultaneously with the exertion of a pull upon the line 5, so that the fish is effectively hooked. The swinging of the barb results in relative positioning of the barb and the spring tongue as shown in Figure 1, wherein the spring tongue is shown in dotted lines as disposed on the far side of the hook relative to the barb 8. Thus, the tongue and barb become clear of each other, so that the tongue will not interfere with the hooking action described.

What is claimed is:

A combined fish hook and bait holder comprising a hook including a shank, a hook portion integral therewith, and a barb on the hook portion; and a bait holder comprising a length of spring wire one end of which is secured to the shank, said spring wire being wound spirally in a series of spring coils upon the shank, said coils terminating approximately abreast of the barb and on the opposite side of the barb, the other end of said spring wire being formed as a spring tongue adapted to pass through a bait and being extended laterally from the spring coils to said barb and being releasably engaged under said barb, the terminal coil being resiliently effective to swing the spring tongue substantially horizontally away from the barb.

GEORGE A. SWEETMAN.

REFERENCES CITED

The following references are of record in the file of this patent:

UNITED STATES PATENTS

| Number | Name | Date |
| --- | --- | --- |
| 745,221 | Miller | Nov. 24, 1903 |
| 1,629,510 | Klipec | May 24, 1927 |
| 2,051,651 | Pachner et al. | Aug. 18, 1936 |
| 2,078,162 | Robins | Apr. 20, 1937 |